H. M. Stow.
Wood Pavement
No. 3,274. Reissued Jan. 19, 1869.
MODEL 'A'
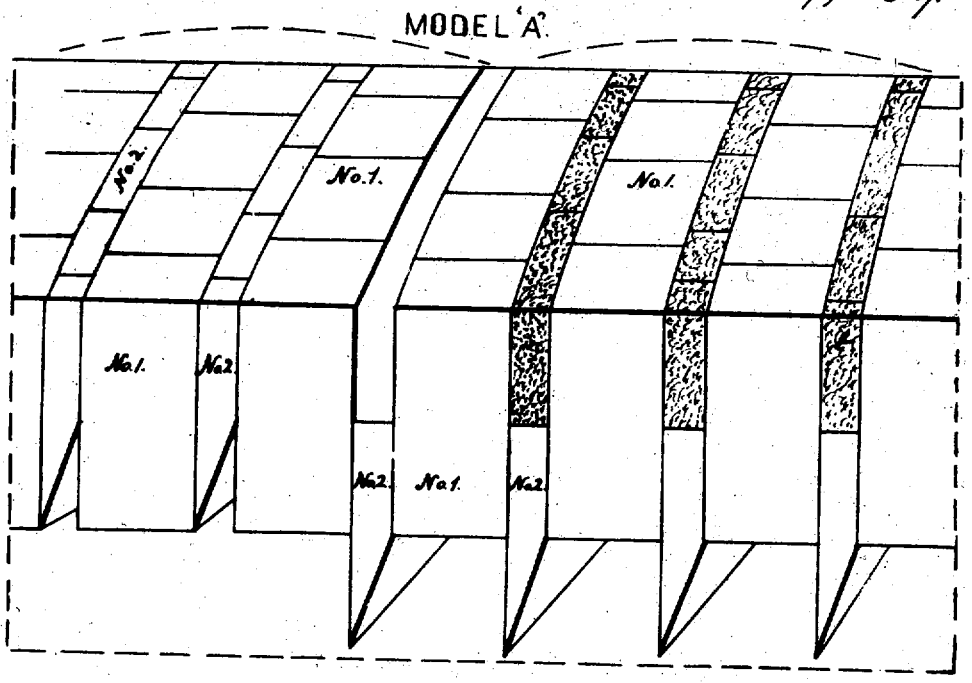
MODEL 'B'
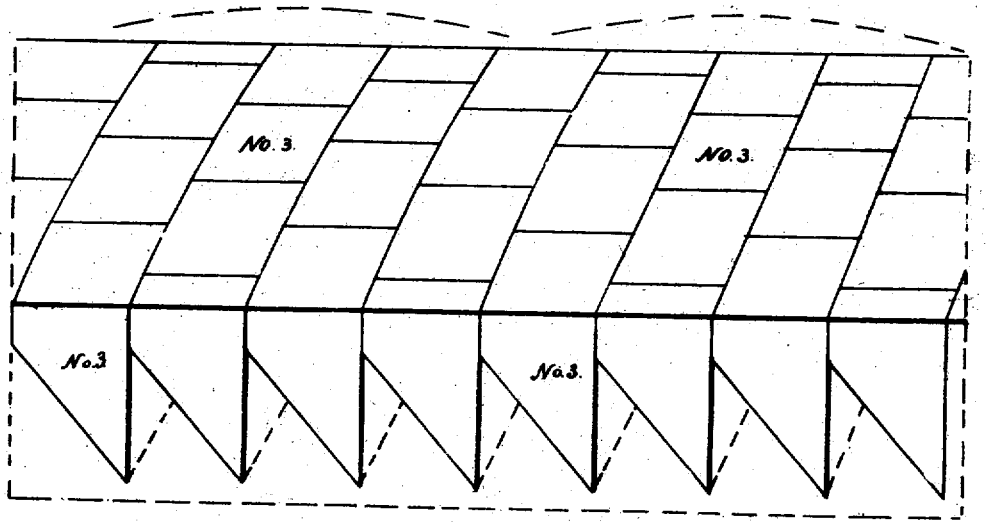
Witnesses.
John B. Brady
Daniel Gorham.
Henry M. Stow
Inventor.

UNITED STATES PATENT OFFICE.

HENRY M. STOW, OF SAN FRANCISCO, CALIFORNIA.

IMPROVED PAVEMENT.

*Specification forming part of Letters Patent No. 72,110, dated December 10, 1867; reissue No. 3,274, dated January 19, 1869.*

*To all whom it may concern:*

Be it known that I, HENRY M. STOW, of the city and county of San Francisco, in the State of California, have invented a new and useful Improvement in Pavements for streets, sidewalks, and ground and cellar floors; and I do hereby declare that the following is a full, clear, and exact description thereof, reference being had to the accompanying drawings, and to the letters and figures of reference marked thereon.

Figure A is a perspective view of a section of my street pavement, that part of the figure designated by the letter C representing the pavement in process of construction and that part designated by C′ representing it as completed. Fig. B is a perspective view of a section of my improved pavement as adapted to sidewalks, ground and cellar floors.

The nature of my invention consists in putting down a pavement of wood or other suitable material upon a foundation-bed of sand or loose earth, and packing the sand or earth by means of wedge-blocks driven down into the same, and forming a part or the whole of the pavement.

In constructing the street pavement the street is first filled with clear sand, loam, or loose earth, free from stones, to within about four to six inches of the desired street-grade, (according to the length of blocks,) and smoothed off so as to conform to the desired arch or crown of the street. Then blocks of wood or other suitable material, marked No. 1 in the drawings, are set on their ends in a tier across the street, these blocks being cut square at both ends. Next, a tier of blocks, marked No. 2 in the drawings, made wedge-shaped at their lower ends by beveling on one side, is set across the street close against the first tier of square-ended blocks, and then another tier of square-ended blocks is set up, as before, and so on alternate tiers of square and wedge-shaped blocks are placed until a space of ten feet or more is covered. Then the wedge-shaped blocks are driven down into the sand or earth with a rammer and swage until the upper ends are below the upper ends of the square-ended blocks No. 1 and the foundation is of the desired compactness. The said wedge-shaped blocks No. 2 may be made of the same length as the blocks No. 1, and may be driven down until their upper ends reach about the center of said blocks No. 1, as shown in Fig. A of the drawings, in which case the open spaces above them, between the blocks No. 1, are to be filled with gravel; or the said blocks No. 2 may be made some two or three inches longer than the blocks No. 1 and driven down until their upper ends are only half or three-fourths of an inch, or thereabout, below the upper ends of blocks No. 1, leaving shallow grooves, merely to give a foothold for horses and other animals traveling on the pavement. The said blocks No. 1 should be from four to six inches long, (or deep,) about three inches thick, and of any convenient width. The blocks No. 2 may be about one inch thick and of any convenient width. But I do not limit myself to these dimensions.

The blocks should be set so as to break joints. The driving down of the wedge-shaped blocks, as described, packs the sand or earth so compactly that the most heavily-laden wagons passing over the pavement will never occasion any unevenness in the surface thereof. The sand or earth forming the foundation-bed should be thoroughly wet when the blocks are put down. The blocks, when of wood, are to be so formed and set in the pavement that the grain of the wood will be vertical, and they may be saturated with coal or gas tar, or any liquid hydrocarbon or other resinous substance which will tend to preserve the wood from decay, before being set in the pavement. When the blocks are sufficiently hammered down, the whole surface of the pavement should be thoroughly saturated with boiling-hot coal-tar, asphaltum, pitch, oil and asphaltum, or other pitchy substance, and covered with clean sand at least half an inch in thickness.

When the foundation-bed is composed of sand or loose sandy earth, it will not be absolutely necessary to bevel the lower ends of the blocks No. 2, as even square-ended blocks will operate as wedges, and on being driven down into the foundation-bed will pack the same sufficiently. I prefer, however, to make the blocks to be driven down into the foundation-bed wedge-shaped at their lower ends, as described.

Nor is it absolutely necessary that the blocks, when of wood, be sawed or dressed into regular forms and set in regular tiers, as a very good cheap pavement, involving the principle of my invention, may be made of blocks of split wood, of irregular form, set on their ends, and a proper proportion of them, at regular intervals, (as near as may be,) driven down into the foundation-bed, so as to produce the requisite packing of the same.

While I regard my invention as most appropriately applicable to wooden pavements, it is manifest that said blocks No. 1 may be of dressed stone, or of a concrete composition, molded into the form of blocks, of dimensions similar to those shown in the drawings, or into the form of continuous blocks or ribs running clear across the street, or any portion of said distance, and the blocks No. 2 may be of dressed stone, brick, or wood, or of any suitable material that will bear driving down into the foundation-bed.

For sidewalks and ground or cellar floors, I make all of the blocks of the same length and thickness, and make the lower ends all of wedge form, by beveling one side, as shown in Fig. B. For sidewalks, I make the blocks from two to four inches in thickness and from four to six inches long; but for floors of buildings, I prefer to make them larger, say, from four to six inches wide and from six to twelve inches long. But I do not limit myself in either case to any specific dimensions.

The blocks should be set so as to break joints in all cases, whether for street pavements, sidewalks, or floors.

I do not claim leaving a space between the upper portions of the square-ended blocks No. 1 and filling said space with gravel, as I am advised that is not new, but is covered by the patent granted to Samuel Nicolson, August 8, 1854, and the reissues thereof; but What I do claim as my invention, and desire to secure by Letters Patent, is—

1. A pavement composed of alternate tiers of square-ended and wedge-shaped blocks, the wedge-shaped ends of the latter being driven into a foundation-bed of sand or earth, substantially as and for the purpose described.

2. A pavement composed of blocks with lower ends wedge-formed, and all driven down into a foundation-bed of sand or earth, substantially as shown and described.

3. A pavement composed of wood, or in whole or in part of other suitable material, laid on a foundation-bed of sand or loose earth, as described, and a portion of the blocks driven down into said foundation-bed to pack the same, substantially as and for the purpose specified.

HENRY M. STOW.

Witnesses:
J. J. COOMBS,
JOS. L. COOMBS.